Patented June 15, 1937

2,083,652

UNITED STATES PATENT OFFICE 2,083,652

SEPARATE RECOVERY OF POTASSIUM PHOSPHATES AND AMMONIUM PHOSPHATES

Oskar Kaselitz, Berlin, Germany

No Drawing. Application January 30, 1935, Serial No. 4,078. In Germany February 10, 1934

7 Claims. (Cl. 23—107)

The present invention relates to the separate recovery of potassium phosphates and ammonium phosphates and to the production of mixed fertilizers containing these salts. It is an object of my invention to provide means whereby these products can be produced in a particularly effective and economical way.

When decomposing phosphates with sulfuric acid and potassium sulfate, there are obtained solutions containing phosphoric acid and potassium phosphate. These solutions can be treated in various ways for the production of mixed fertilizers or of alkali phosphates. For instance, if saturating such solution, either before or after evaporation, up to starting crystallization, with ammonia, there is obtained a partly crystallized mixture of ammonium phosphate and potassium phosphate, which can then be evaporated to dryness. However to separate the two phospates by fractional crystallization or by recrystallization has been found to be scarcely possible on a large scale. However the two phosphates, if sold singly, are far more valuable in commerce than their mixtures, and moreover offer particular advantages when used in the production of mixed fertilizers containing a predetermined percentage of predetermined fertilizing components, since in contradistinction to mixtures containing three such components they merely contain two.

I have found that it is possible to recover ammonium phosphate and potassium phosphate separately, if a quantity of ammonia gas is introduced under cooling into solutions of phosphoric acid containing potassium phosphate or into solutions of the two phosphates (ammonium phosphate and potassium phosphate) such that at the least all that phosphoric acid is precipitated in the form of ammonium triphosphate which, calculating for monophosphate, is not linked to potassium.

The introduction of ammonia can be continued as long as ammonium triphosphate is precipitated free from the alkali phosphates. The triammonium phosphate is now filtered off and the filtrate is evaporated at the free air or in vacuo for the recovery of potassium phosphate.

The two phosphates thus obtained possess the degree of purity required in technical products.

The concentration of the starting solution may vary within wide limits, but I have found it preferable to start from solutions, which are not too highly diluted, in order to restrict the quantity of ammonia to be added as far as possible. I have found this to be particularly advantageous if the percentage of potassium phosphate in the mixture of phosphates is comparatively low.

Obviously the applicability of the new process is not limited to solutions resulting in the decomposition of phosphates nor to the mixtures of phosphoric acid and phosphate, or of two phosphates, which result in the evaporation of such solutions. The new process is applicable to all mixtures of a similar kind such as for instance the double salt $KH_2PO_4.H_3PO_4$, or to products obtained when reacting ammonium phosphate with potassium chloride.

It is to be understood that the new process concerns the cases wherein the original mixture contains more than that amount of phosphate which would be sufficient to form with the potassium present potassium monophosphate, since in other cases the potassium phosphate may be recovered directly by evaporating the solution.

I have further found that it is very advantageous for the production of mixed fertilizers to mix the filtrate with a quantity of a nitrogen acid such as nitric acid such that a mixture is obtained containing besides the monophosphate also the nitrate, and to evaporate and dry the resulting solutions to obtain a solid mixture. The evaporation may also take place, at least partly, before adding the nitric acid. I thus obtain fertilizer mixtures containing potassium, nitrogen and phosphorus, which are very valuable as plant nutrients and contain various proportions of the monophosphates and nitrates of potassium and ammonium.

If larger quantities of ammonium nitrate are present, I have found it preferable, in order to render the mixture better storable, to add certain alkali salts and more especially chlorides and/or sulfates, which react under the formation of non-hygroscopic salts, for instance according to the equation $KCl + NH_4NO_3 = KNO_3 + NH_4Cl$.

I more especially contemplate using potassium chloride and potassium sulfate, or raw potassium salts such as sylvenit, or other products such as potassium magnesia.

In the mixtures obtainable according to this invention all kinds of combinations and proportions of the fertilizing components can be produced in accordance with the requirements of each individual case and other fertilizing ingredients may be added for the same purpose.

The mixed fertilizers obtainable according to this invention are particularly insensitive against atmospheric influences.

In practising my invention I may for instance proceed as follows:

Example 1

Into 236 cubic centimetres of a solution containing 40.8 grams potassium monophosphate and 34.5 grams ammonium monophosphate are introduced under cooling at 20° C. 21 grams ammonia. The triammonium phosphate separating out is filtered off by suction; about 100 grams of the moist phosphate are thus obtained. The percentage of potassium in the product corresponds to the quantity of liquor still adhering to it. The mother liquor containing potassium is evaporated for the recovery of the potassium phosphate, about 30 grams of which are obtained.

Example 2

To 100 grams of a solution obtained by introducing ammonia gas into a mixture of solutions of potassium phosphate and ammonium phosphate and separating and filtering off the triammonium phosphate, the original solution containing

|  | Grams |
|---|---|
| $PO_4$ | 10.9 |
| K | 5.6 |
| $NH_4$ | 3.5 | are added 14 grams nitric acid of 100% under the form of 21.6 grams of 65% by weight. This solution is now evaporated to dryness and there are obtained 36 grams of a mixture of monoammonium phosphate, potassium nitrate and ammonium nitrate, which, when dry, contains

|  | Per cent |
|---|---|
| Ammonia nitrogen | 7.6 |
| Nitrate nitrogen | 8.7 |
| Potassium | 15.6 |
| $PO_4$ | 30.3 |

Various changes may be made in the details disclosed in the foregoing specification without departing from the invention or sacrificing the advantages thereof.

I claim:—

1. The process of separately recovering potassium phosphate and ammonium phosphate from a mixture consisting of both these salts, comprising treating the mixture in the presence of at least so much water that in carrying through the process all the phosphate is once dissolved, with that quantity of ammonia, which suffices to precipitate the phosphoric acid, which, calculated for monophosphate, is not linked to the alkali metal, under the form of triammonium phosphate, without any alkali salts being precipitated, thereafter separating the triammonium phosphate from the solution and evaporating the filtrate near boiling temperature for the recovery of the alkali phosphate.

2. The process of separately recovering potassium phosphate and ammonium phosphate from a mixture consisting of both these salts, comprising treating a suspension containing the two phosphates and at least so much water that in carrying through the process all the phosphate is once dissolved, with that quantity of ammonia, which suffices to precipitate the phosphoric acid, which, calculated for monophosphate, is not linked to the alkali metal, under the form of triammonium phosphate, without any alkali salt being precipitated, thereafter separating the triammonium phosphate from the solution and evaporating the filtrate near boiling temperature for the recovery of the alkali phosphate.

3. The process of separately recovering potassium phosphate and ammonium phosphate from a mixture consisting of both these salts, comprising treating a solution containing the two phosphates with that quantity of ammonia, which suffices to precipitate the phosphoric acid, which, calculated for monophosphate, is not linked to the alkali metal, under the form of triammonium phosphate, without any alkali salt being precipitated, thereafter separating the triammonium phosphate from the solution and evaporating the filtrate near boiling temperature for the recovery of the alkali phosphate.

4. In the process of claim 1 the steps of adding to the filtrate that quantity of a nitrogen acid which suffices to convert all phosphates present into monophosphates, and drying the mixture.

5. In the process of claim 1 the steps of adding to the filtrate that quantity of nitric acid which suffices to convert all phosphates present into monophosphates, and drying the mixture.

6. In the process of claim 1 the steps of adding to the filtrate that quantity of a nitrogen acid which suffices to convert all phosphates present into monophosphates, adding a potassium salt and drying the mixture.

7. In the process of claim 1 the steps of adding to the filtrate that quantity of nitric acid which suffices to convert all phosphates present into monophosphates, adding a potassium salt and drying the mixture.

OSKAR KASELITZ.